United States Patent [19]

Iida et al.

[11] Patent Number: 4,843,456
[45] Date of Patent: Jun. 27, 1989

[54] WHITE BALANCE ADJUSTING DEVICE FOR A COLOR VIDEO CAMERA

[75] Inventors: Takashi Iida, Kyoto; Masatoshi Itoh, Takatsuki; Hidenori Fukuoka, Toyonaka; Takeya Tsukamoto, Amagasaki; Takashi Kondo, Izumi, all of Japan

[73] Assignee: Minolta Camera Kabushiki Kaisha, Osaka, Japan

[21] Appl. No.: 76,696

[22] Filed: Jul. 22, 1987

[30] Foreign Application Priority Data

| Jul. 24, 1986 | [JP] | Japan | 61-174326 |
| Jul. 24, 1986 | [JP] | Japan | 61-174327 |
| Oct. 21, 1986 | [JP] | Japan | 61-251161 |
| Oct. 21, 1986 | [JP] | Japan | 61-251160 |

[51] Int. Cl.⁴ .......................... H04N 9/73; H04N 9/04
[52] U.S. Cl. ......................................... 358/29; 358/41
[58] Field of Search .................... 358/29 C, 41, 43, 44

[56] References Cited

U.S. PATENT DOCUMENTS

| 4,249,197 | 2/1981 | van Spaandonk et al. | 358/29 C |
| 4,355,325 | 10/1982 | Nakamura et al. | 358/29 C |
| 4,527,189 | 7/1985 | Ooi et al. | 358/29 C |
| 4,584,598 | 4/1986 | Kujaragi | 358/29 C |
| 4,605,955 | 8/1986 | Hashimoto et al. | 358/29 C |

FOREIGN PATENT DOCUMENTS

| 56-140789 | 11/1981 | Japan | 358/29 C |
| 57-69986 | 4/1982 | Japan | 358/29 C |
| 57-127376 | 8/1982 | Japan | 358/29 C |
| 58-225792 | 12/1983 | Japan . | |
| 59-144292 | 8/1984 | Japan . | |
| 59-215189 | 12/1984 | Japan | 358/29 C |
| 60-244178 | 12/1985 | Japan | 358/29 C |
| 60-244183 | 12/1985 | Japan | 358/29 C |
| 61-2486 | 1/1986 | Japan | 358/29 C |
| 61-7178 | 1/1986 | Japan . | |

OTHER PUBLICATIONS

Adrian Bailey, The Illustrated Dictionary of Photography, Exeter Books, New York, 1987, entries for "Mired", Photoflood Lamp, and Tungsten Lighting.

Primary Examiner—Tommy P. Chin
Assistant Examiner—Randall S. Svihla
Attorney, Agent, or Firm—Burns, Doane, Swecker & Mathis

[57] ABSTRACT

The present invention relates to a white balance adjusting device for a color video camera for photographing an object irradiated by light from a blackbody radiation source or a non-blackbody radiation source. When recording operation is being performed, the white balance adjusting device prevents the moving operation of a fluorescent light correction filter and a color temperature conversion filter into an optical path of image pickup means and permits a white balance adjustment operation performed by electrically correcting an output of the image pickup means. When a recording operation is not being performed, the white balance adjusting device permits the moving operation of the fluorescent light correction filter and the color temperature conversion filter into the optical path and permits white balance adjustment operation performed by electrically correcting the output of the image pickup means.

11 Claims, 18 Drawing Sheets

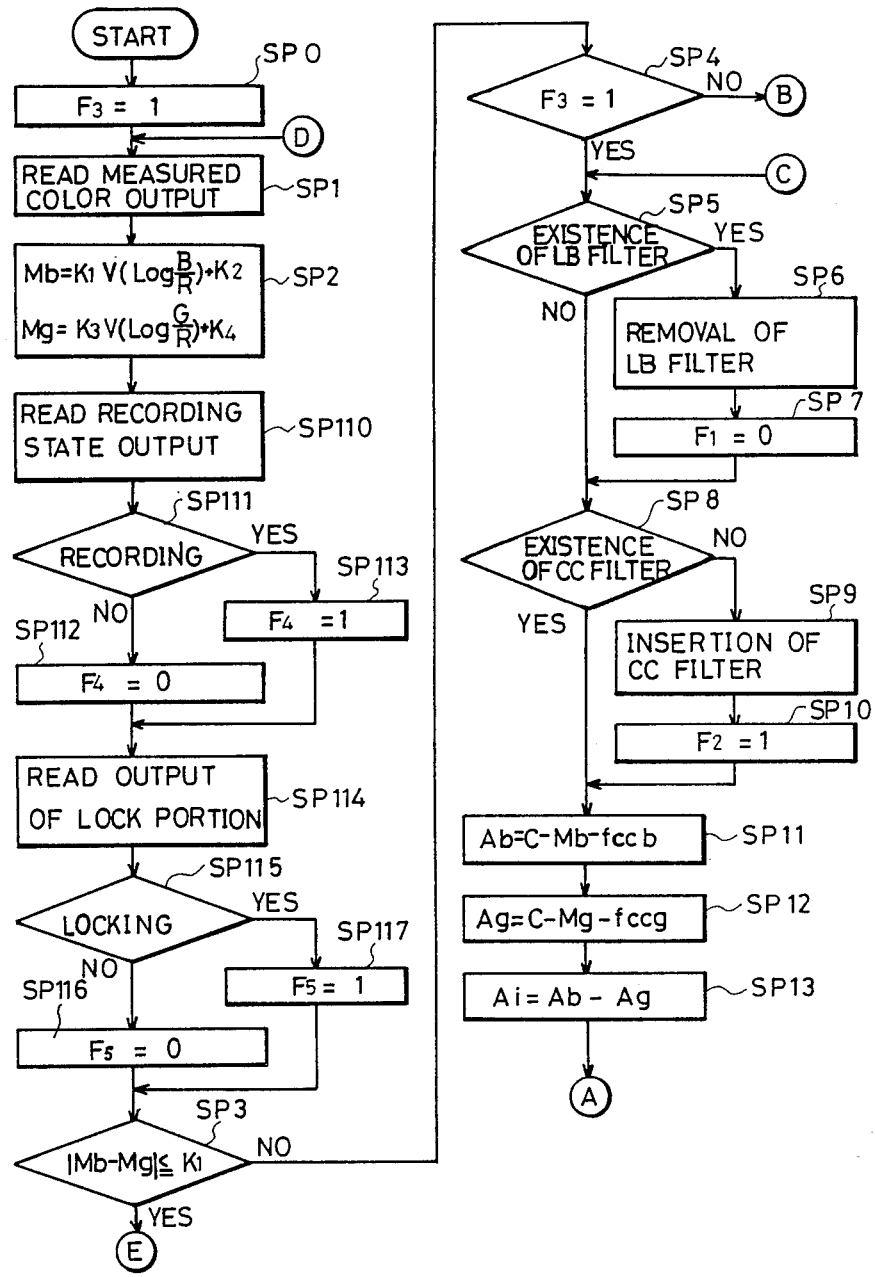

FIG.16

| CALCULATED VALUES M(I) | EXPOSURE CORRECTION OUTPUTS MM (J) |
|---|---|
| $\alpha_1$ | $\beta_1$ |
| $\alpha_2$ | $\beta_2$ |
| $\alpha_3$ | $\beta_3$ |
| ⋮ | ⋮ |
| $\alpha_{N-1}$ | $\beta_{N-1}$ |
| $\alpha_N$ | $\beta_N$ |

WHITE BALANCE ADJUSTING DEVICE FOR A COLOR VIDEO CAMERA

BACKGROUND OF THE INVENTION

1. Field of the Invention

The present invention relates to a white balance adjusting device of a video camera. More particularly, the present invention relates to a white balance adjusting device of a color video camera, in which an image output is electrically or optically corrected based on measured color information dependent on a color temperature of external light.

2. Description of Related Art

Japanese Patent Laying-Open Gazette (Kokai) No. 59-144292 or Japanese Utility Model Laying-Open Gazette (Kokai) No. 61-7178 for example proposes a white balance adjusting device of a video camera, in which an image output is electrically corrected based on information of color temperature and a color temperature conversion filter is automatically interposed in an optical path for image pickup when the color temperature exceeds a prescribed value. Such a device has an advantage that color temperature determining operation and filter moving operation, which were conventionally attained by manual handling of a photographer, can be automatically performed.

On the other hand, recently, the minimum intensity of illuminance permitting image pickup means of a video camera to pick up an image is lowered to such a degree as to obtain a sufficient image output even by the light of a fluorescent lamp generally used in homes. A fluorescent lamp as a non-blackbody radiation source has generally a characteristic showing a large proportion of a green color component compared with a blue component and a red component in the emitted light and an image output under the illumination of a fluorescent lamp has a greenish color. Under the circumstances, there is available a non-blackbody radiation correction filter specially used for fluorescent lamp, namely, a fluorescent light correction filter for correcting such greenish output. However, use of such a correction filter in a conventional device is inconvenient since manual operation by a photographer is required to move into or from an optical path of image pickup means based on determination by the photographer as to whether an object is irradiated by a fluorescent lamp or not. Generally, fluorescent lamps of three types having different spectral energy distribution characteristics (namely, a white light type, a daylight type and a three-wavelength type) are used arbitrarily in homes and ratios of the red, green and blue color components in the respective types are different. Consequently, precise white balance adjustment cannot be made only by interposing a fluorescent light correction filter in an optical path.

SUMMARY OF THE INVENTION

Therefore, a principal object of the present invention is to provide a white balance adjusting device in which a non-blackbody radiation correction filter is automatically moved into an optical path in the case of using a non-blackbody radiation source such as a fluorescent lamp and white balance adjustment can be performed with precision irrespective of a type of the non-blackbody radiation source.

Briefly stated, in a first aspect of the present invention, a white balance adjusting device comprises: image pickup means for picking up an image of an object; color measuring means for outputting color information dependent on a color temperature of external light; correction means for electrically correcting an output of the image pickup means based on the color information outputted from the color measuring means, thereby to perform white balance adjustment; optical filter means selectively interposed in an optical path of the image pickup means for optically correcting the output of the image pickup means; drive means for moving the optical filter means into or from the optical path based on the color information; recording detection means for detecting a state of recording on the output of the image pickup means; and control means. The control means forbids operation of the drive means and permits operation of the correction means upon detection of the recording state by the recording detection means, and permits operation of the drive means and operation of the correction means upon detection of the non-recording state by the recording detection means.

Thus, according to the first aspect of the invention, a high-speed drive portion for interposing or removing a filter in a vertical blanking period as required in a conventional device is not required and since driving of the filter in a non-recording state does not need to be performed at high speed, drive means of a low cost can be utilized. In addition, since the image output is electrically corrected in a recording state, color reproduction can be performed smoothly even if light of the light source changes during recording operation.

In a second aspect of the invention, there are provided light source determination means for determining based on color information outputted from the color measuring means whether a light source irradiating an object to be picked up by the image pickup means is a blackbody radiation source or a non-blackbody radiation source, a non-blackbody radiation correction filter selectively interposed in an optical path of the image pickup means for optically correcting an output of the image pickup means in the light of a non-blackbody radiation source, correction means for performing white balance adjustment, and control means. The control means controls the drive means to cause the non-blackbody radiation correction filter to be moved into the optical path when the light source determination means determines that the light source is a non-blackbody radiation source, and to cause the non-blackbody radiation correction filter to be moved from the optical path when the light source determination means determines that the light source is a blackbody radiation source.

Thus, according to the second aspect of the invention, white balance adjustment can be performed automatically and precisely even if an object is irradiated by a non-blackbody radiation source such as a fluorescent lamp.

In addition, in a third aspect of the invention, there are further provided, besides the above described means in the second aspect, difference determination means for determining whether a difference between a reference color temperature for the image pickup means and a color temperature of the color information exceeds a prescribed value or not, a color temperature conversion filter for optically converting a color temperature of a blackbody radiation source to the reference color temperature, and color temperature conversion filter drive means for moving the color temperature conversion filter into or from the optical path of the image pickup means. The control means controls the color temperature conversion filter drive means to cause the color temperature conversion filter to be moved into the optical path when the difference determination means determines that the difference in the color temperature of the color information exceeds the prescribed value, and to cause the color temperature conversion filter to be moved from the optical path when the difference determination means determines that the difference does not exceed the prescribed value.

Thus, according to the third aspect of the invention, it becomes possible not only to optically correct the output of the image pickup means in the light of a non-blackbody radiation source by means of the non-blackbody radiation correction filter, but also to correct a color temperature of a blackbody radiation source according to the reference color temperature.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7A to 7G are flow charts for explaining operation of the embodiment shown in FIG. 2.

FIG. 16 is an illustration showing contents stored in an ROM included in the embodiment shown in FIG. 14.

DESCRIPTION OF THE PREFERRED EMBODIMENT

Figure 1:
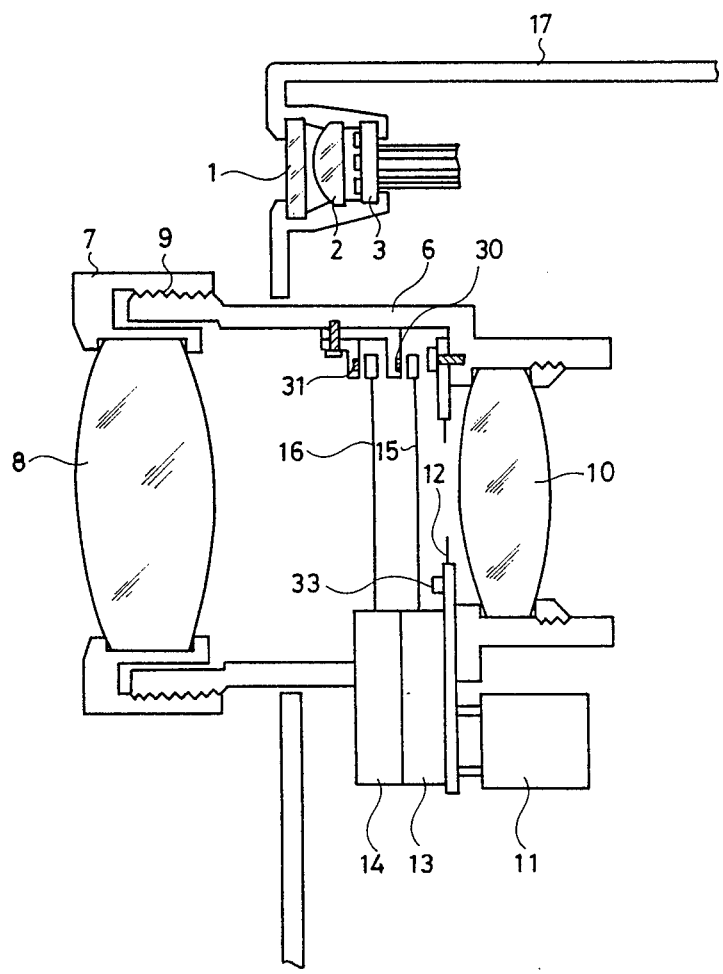
FIG. 1 is a sectional view of a main part of a video camera in which an embodiment of the present invention is applied.
Figure 2:
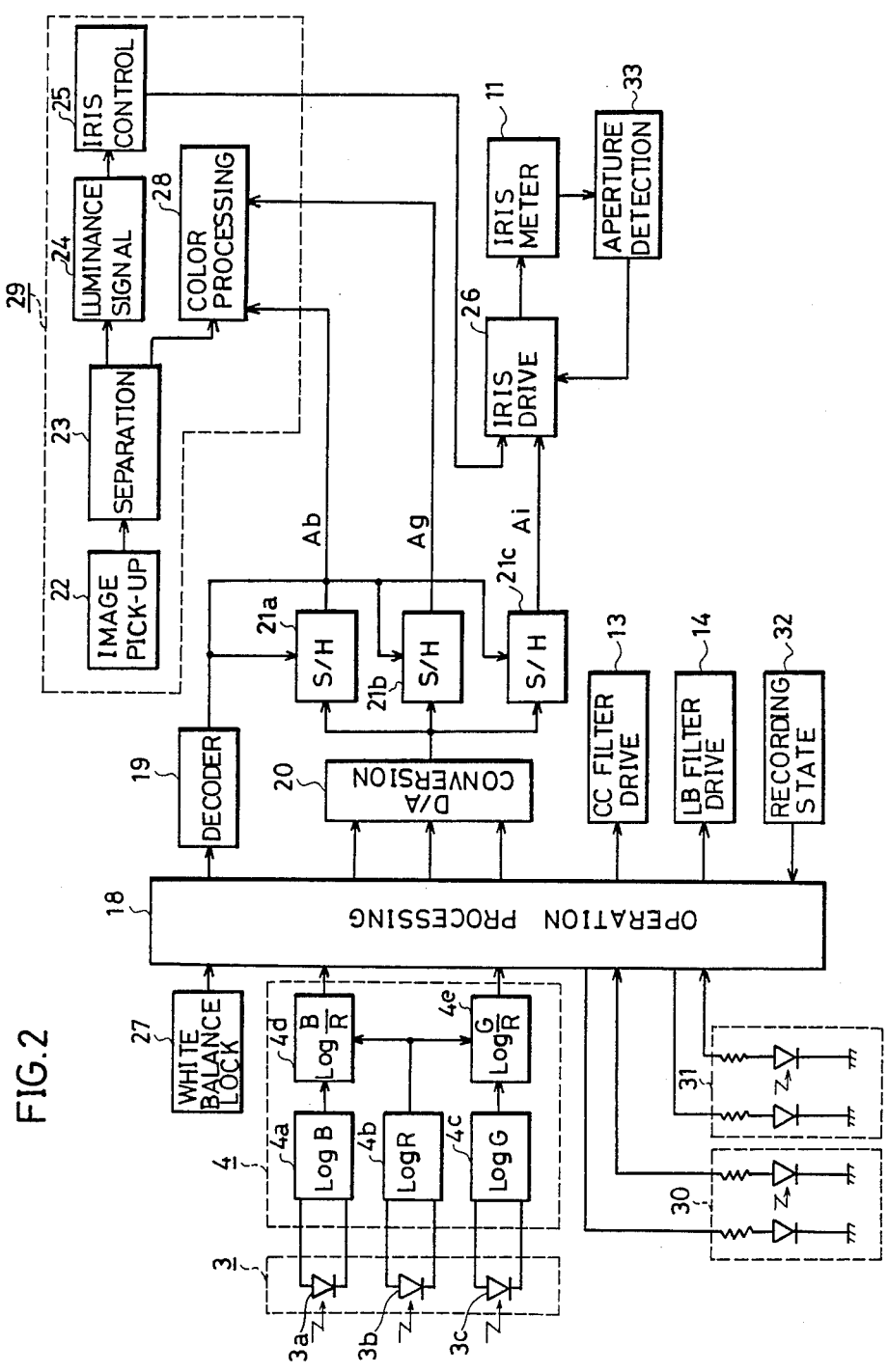
FIG. 2 is a schematic block diagram showing an entire circuit configuration of the above stated embodiment of the present invention.
Figure 10:
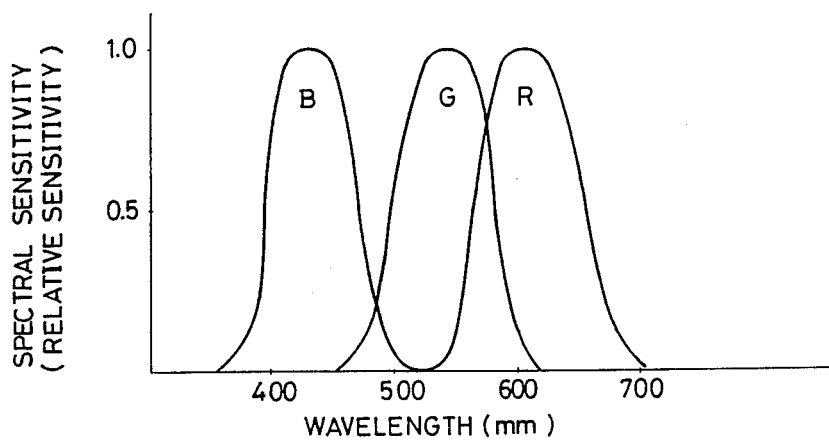
FIG. 10 is a graph showing spectral sensitivity of color measuring means.

FIG. 1 is a sectional view showing a main mechanism of a color video camera of an embodiment of the present invention and FIG. 2 is a block diagram showing an entire circuit configuration of this embodiment. Referring to FIG. 1, color measuring means for outputting color information according to a color temperature comprises a light receiving window 1 formed of a plate in milky color, a condenser lens or converging lens 2, a color temperature sensor 3 and a color measuring circuit 4 shown in FIG. 2. The light receiving window 1, the condenser lens 2, the sensor 3 and the color measuring circuit 4 are integrally formed as a white balance detection sensor module, which is fixed in a camera body 17. The sensor 3 comprises three light receiving elements 3a, 3b and 3c for receiving external light passing through the light receiving window 1 and the condenser lens 2. A blue color component transmitting filter, a red color component transmitting filter and a green color component transmitting filter are provided in front of those light receiving elements 3a, 3b and 3c, respectively. The light receiving elements 3a, 3b and 3c have spectral sensitivity characteristics as shown in FIG. 10 and output electric signals Ib, Ir and Ig corresponding to blue, red and green spectral components of external light, respectively.

A photographing lens unit comprises two lenses, namely, a front lens group 8 and a rear lens group 10. The front lens group 8 is fixed to a focus ring 7 and the back lens 10 is fixed to a fixed cylinder 6. A front end of the fixed cylinder 6 and the focus ring 7 are engaged with each other on their helicoidal surfaces 9. Thus, the front lens group 8 moves forward and backward along an optical axis by rotation of the focus ring 7 so that focusing is performed. An iris diaphragm 12 of a well-known type is provided between the front lens group 8 and the rear lens group 10. This iris diaphragm 12 is driven by an iris meter 11. An aperture diameter of the iris diaphragm 12 is determined by an iris control signal supplied from a video processing circuit 29 shown in FIG. 2 to the iris meter 11 through an iris drive circuit 26. An aperture detection circuit 33, which is incorporated in the iris meter 11, detects an aperture diameter of the diaphragm 12 by means of a magnetic sensor such as a Hall element.

Figure 3:
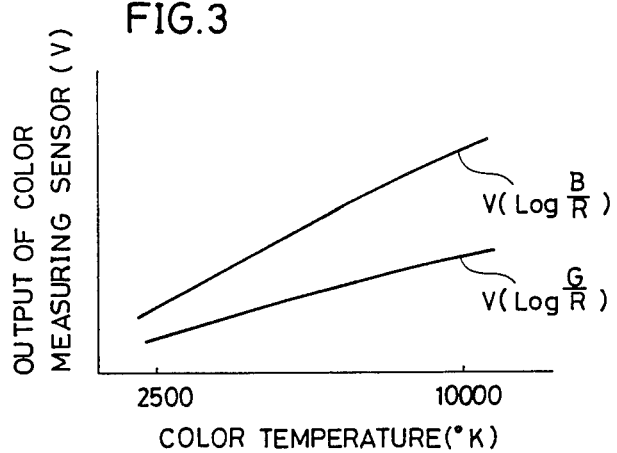
FIGS. 3 to 5 are graphs showing relations between an output of the color measuring circuit shown in FIG. 2 and color temperatures.
Figure 4:
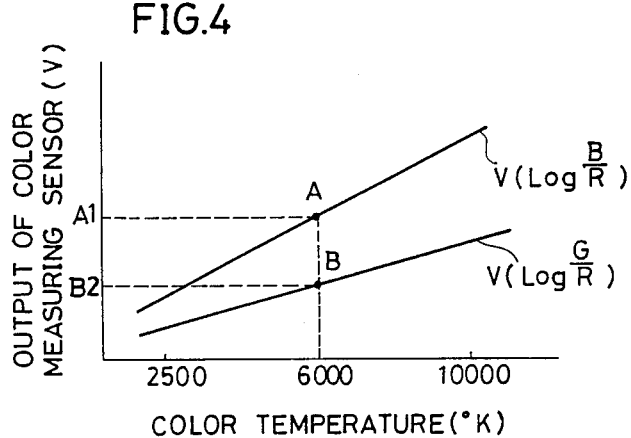
Figure 11:
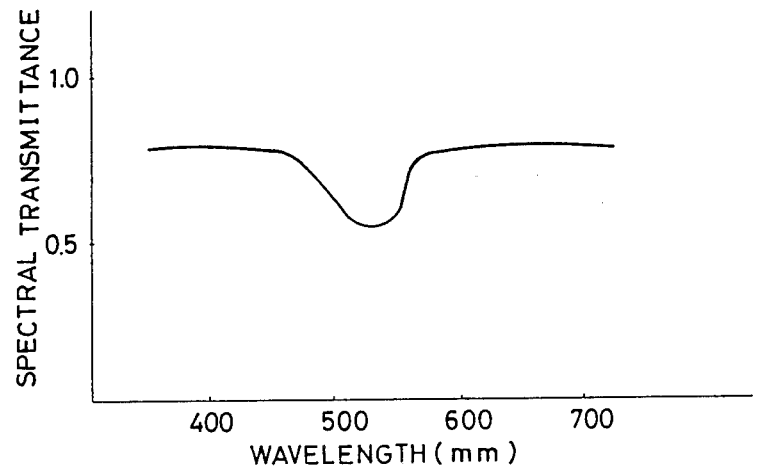
FIG. 11 is a graph showing spectral transmittance of a fluorescent light correction filter.

Between the front lens group 8 and the iris diaphragm 12, there are provided a fluorescent light correction filter 15 having spectral transmittance as shown in FIG. 11 and a color temperature conversion filter 16, which are movable into and from an optical path. Those filters are driven by filter drive circuits 13 and 14 such as plungers. Movement of those filters is determined according to levels (high or low) of signals supplied from an operation processing portion 18 shown in FIG. 2 to the driving circuits. Switches 30 and 31 for detecting existence or nonexistence of the filters in the optical path are provided in the vicinity of the moving loci of those filters 15 and 16, respectively. Those switches 30 and 31 are optical photo interrupters for detecting transmitted light or reflected light, and each switch comprises an infrared light emitting diode and an infrared photodiode for example. In the cases of using such optical photo interrupters, it is preferable to provide covers around the photo interrupters, for example, so that the emitted light may not enter an image pickup means In the color measuring circuit 4 shown in FIG. 2, logarithmic transformation circuits 4a, 4b and 4c transform logarithmically and amplify the signals Ib, Ir and Ig inputted from the light receiving elements 3a, 3b and 3c, respectively. The logarithmically transformed signals logIb and logIr are inputted to a subtraction circuit 4d so as to be inputted to the operation processing portion 18 as a voltage signal $V(\log B/R) = \log Ib - \log Ir$ representing a ratio of blue to red. In the same manner, the logarithmically transformed signals logIg and logIr are inputted to a subtraction circuit 4e so as to be inputted to the operation processing portion 18 as a voltage signal $V(\log G/R) = \log Ig - \log Ir$ representing a ratio of green to red. Those ratios $V(\log B/R)$ and $V(\log G/R)$ and the color temperature are in a relation in which the values of the ratios increase as the color temperature becomes high, as shown in FIG. 3. As can be seen from FIG. 3, those ratios and the color temperature can be regarded as being in a nearly proportional relation and for the purpose of simplification, the following description is made assuming that they are in relations represented by the following equations (1) and (2):

$$Mb = K1 \cdot V(\log B/R) + K2 \quad (1)$$

$$Mg = K3 \cdot V(\log G/R) + K4 \quad (2)$$

where Mb and Mg are color temperatures corresponding to the values of the ratios $V(\log B/R)$ and $V(\log G/R)$, respectively, and K1 to K4 are constants.

Figure 5:
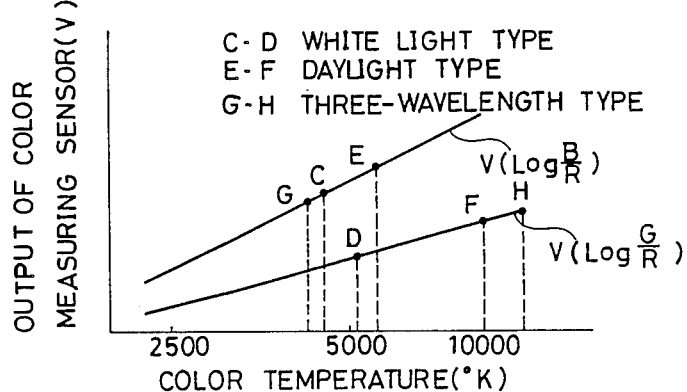
Figure 8:
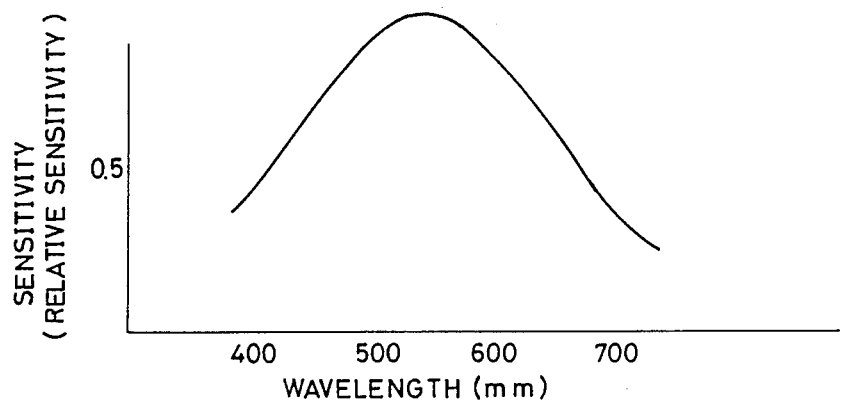
FIG. 8 is a graph showing spectral sensitivity of a luminance signal of a video camera.
Figure 9:
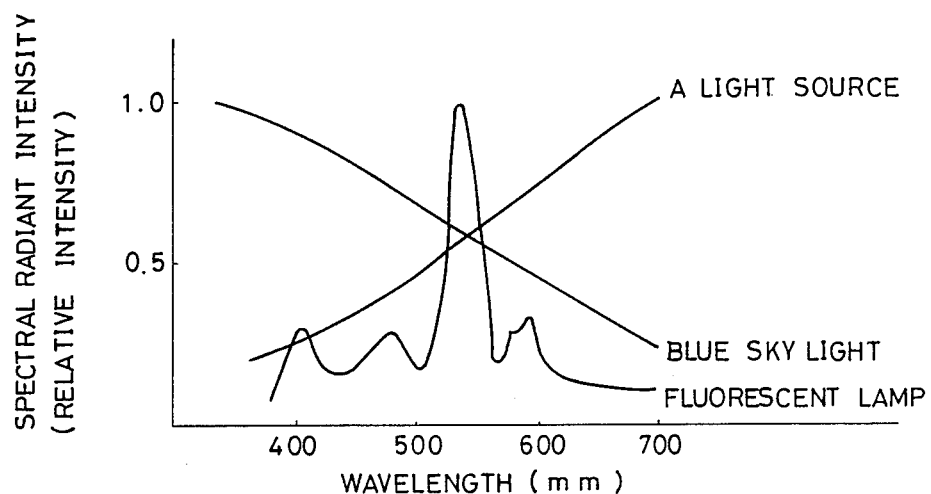
FIG. 9 is a graph showing spectral radiant intensities of various light sources.
Figure 12:
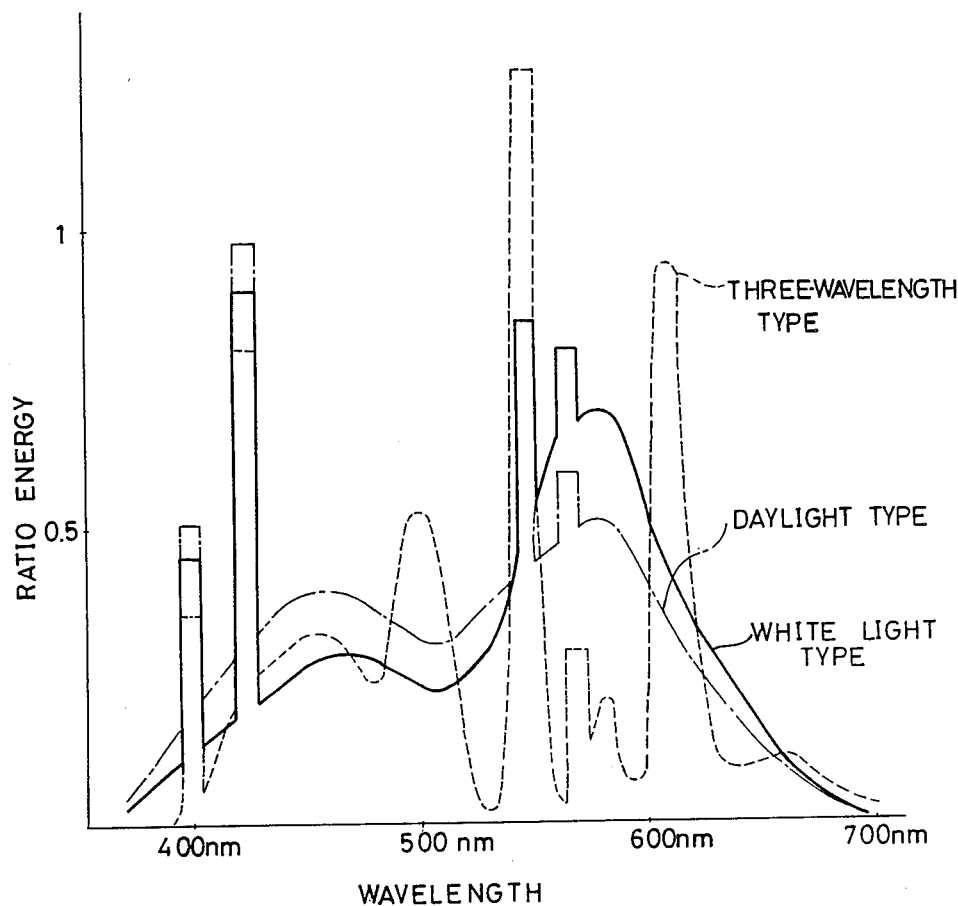
FIG. 12 is a graph showing spectral radiant intensities of various types of fluorescent lamps.

From the above stated equations (1) and (2), the color temperatures corresponding to the ratios $V(\log B/R)$ and $V(\log G/R)$ respectively are obtained, thereby to determine based on a relation of the thus calculated color temperatures Mb and Mg whether the light source irradiating an object is a blackbody radiation source (natural light source) such as the sun or a non-blackbody radiation source (artificial light source) such as a fluorescent lamp. More specifically, if the light source is a natural light source and ratios of A1 and B1 are obtained, the points A and B on the ratio characteristic lines $V(\log B/R)$ and $V(\log G/R)$ represent the same color temperature value (for example, 6000° K) and Mb and Mg are coincident. However, if the light source is an artificial light source, the color temperature values are not coincident. For example, in the case of a fluorescent lamp, spectral energy thereof contains a larger proportion of a green color component compared with a red color component and a blue color component as can be seen from a spectral radiant intensity distribution of a fluorescent lamp shown in FIG. 9. In addition, a spectral sensitivity distribution of a luminance signal contained in an output of the video camera has a peak in the green color region as shown in FIG. 8. Accordingly, the color temperature Mg obtained by the equation (2) is generally higher than the color temperature Mb obtained by the equation (1). In addition, three kinds of fluorescent lamps (namely, a white light color type, a daylight type and a three-wavelength type) having different spectral energies as shown in FIG. 12 are generally utilized in homes and differences of the color temperatures Mb and Mg change dependent on the kinds of the fluorescent lamps as shown in FIG. 5. For example, the points C, E and G in FIG. 5 represent points on the ratio characteristic line $V(\log B/R)$ in the cases of using fluorescent lamps of the white light type, the daylight type and the three-wavelength type, respectively, and the points D, F and H in FIG. 5 represent points on the ratio characteristic line $V(\log G/R)$ in those cases.

Due to the differences of the color temperatures, a deviation amount with respect to a suitable exposure level differs for each fluorescent lamp. However, in this embodiment, an aperture correction value is calculated as described below by obtaining values according to the differences of the above stated calculated color temperatures so that a suitable exposure level can be obtained for each fluorescent lamp.

Referring to FIG. 2, the operation processing portion 18 comprises a microcomputer for example. The operation processing portion 18 converts analog data of the ratios $V(\log B/R)$ and $V(\log G/R)$ inputted from the color measuring circuit 4 to digital data and performs prescribed operation processing based on flow charts in FIGS. 7A to 7G to be described afterwards. Signals outputted by processing in the operation processing portion 18 are four kinds of signals, namely, a color-difference correction signal Ab for adjusting a level of a color-difference signal (R-Y) in the video processing portion 29 to be described afterwards, a color-difference correction signal Ag for adjusting a level of a color-difference signal (B-Y), a signal Ai for correcting an aperture diameter of the iris diaphragm 12 by an amount according to a difference of those correction signals Ab and Ag, and a signal for driving the filter 15 or 16. Among those four kinds of signals, the color-difference correction signals Ab and Ag and the aperture correction signal Ai are converted to analog values by a digital-to-analog converter 20 so as to be inputted to sample-and-hold circuits 21a, 21b and 21c, respectively. Those signals Ab, Ag and Ai are distributed to the above stated sample-and-hold circuits 21a, 21b and 21c by control signals from a decoder 19.

The video processing portion 29 comprises an image pickup means 22 such as a CCD image sensor, a video signal separating circuit 23, a luminance signal generating circuit 24 and a color signal processing circuit 28. An output of the luminance signal generating circuit 24 is supplied to the iris drive circuit 26 through an iris control circuit 25. The iris drive circuit 26 also receives the aperture correction signal Ai inputted to the sample-and-hold circuit 21c. Thus, the iris drive circuit 26 drives the iris meter 11 according to the levels of the luminance signal Y and the aperture correction signal Ai thereby to control the aperture diameter of the iris diaphragm 12. The color signal processing circuit 28 receives correction signals Ab and Ag for image processing inputted to the sample-and-hold circuits 21a and 21b, so that the levels of the color-difference signals (R-Y) and (B-Y) are controlled based on those correction signals. The color signal processing circuit 28 may be adapted to process color signals R, G and B instead of processing the color-difference signals (R-Y) and (B-Y) and, in this case, control operation can be performed in the same manner based on the above stated correction signals.

The output of the operation processing portion 18 is also supplied to the filter drive circuits 13 and 14 and those filter drive circuits drive the fluorescent light correction filter 15 and the color temperature conversion filter 16, respectively, to control movement of those filters into or from the optical path. The fluorescent light filter 15 is moved into the optical path to decrease an excessive green color signal component of the fluorescent lamp when the light source is determined to be a fluorescent lamp, and the color temperature conversion filter 16 is moved into the optical path to lower the color temperature of the light source when a measured color temperature is determined to be higher than a prescribed color temperature.

Figure 6:
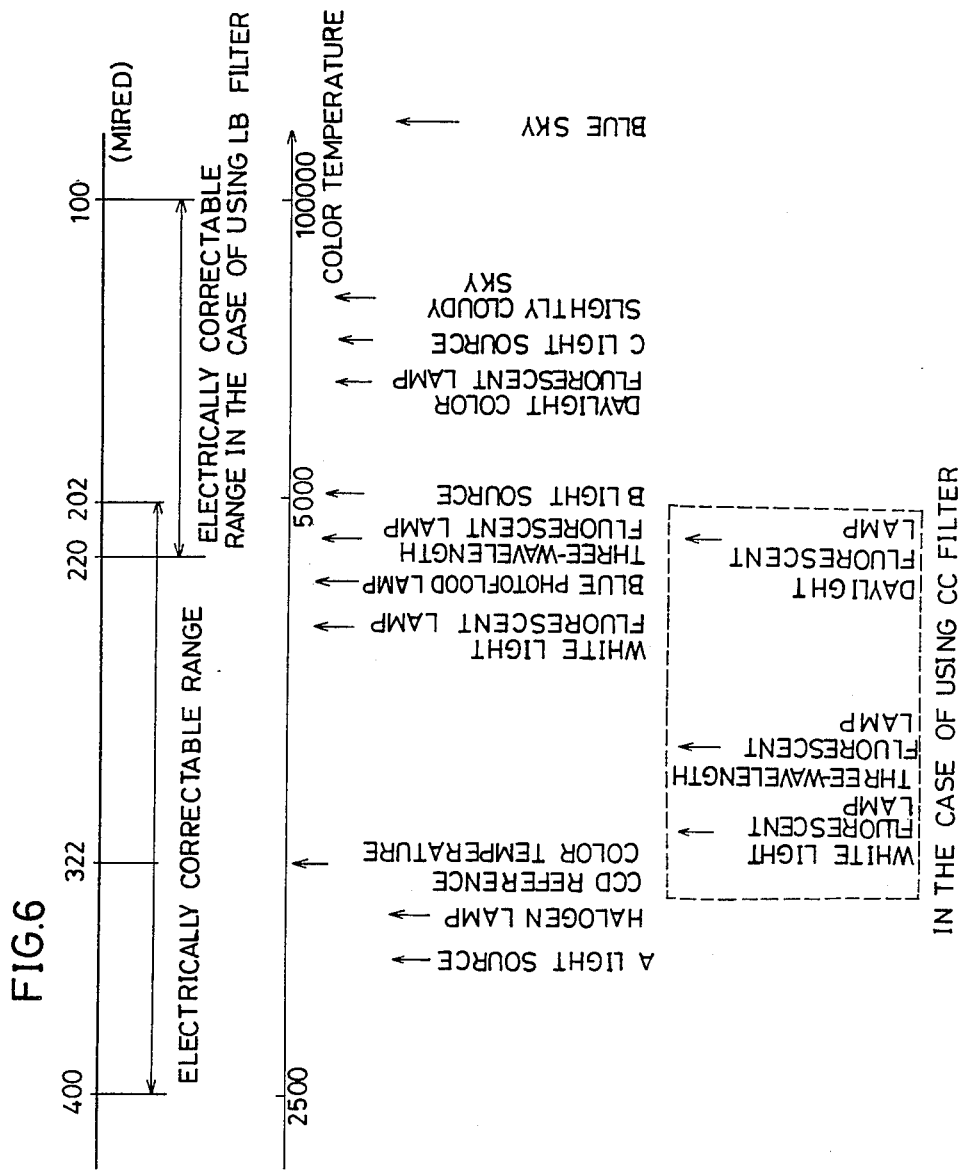
FIG. 6 is a diagram showing color temperatures of various light sources.
Figure 7B:
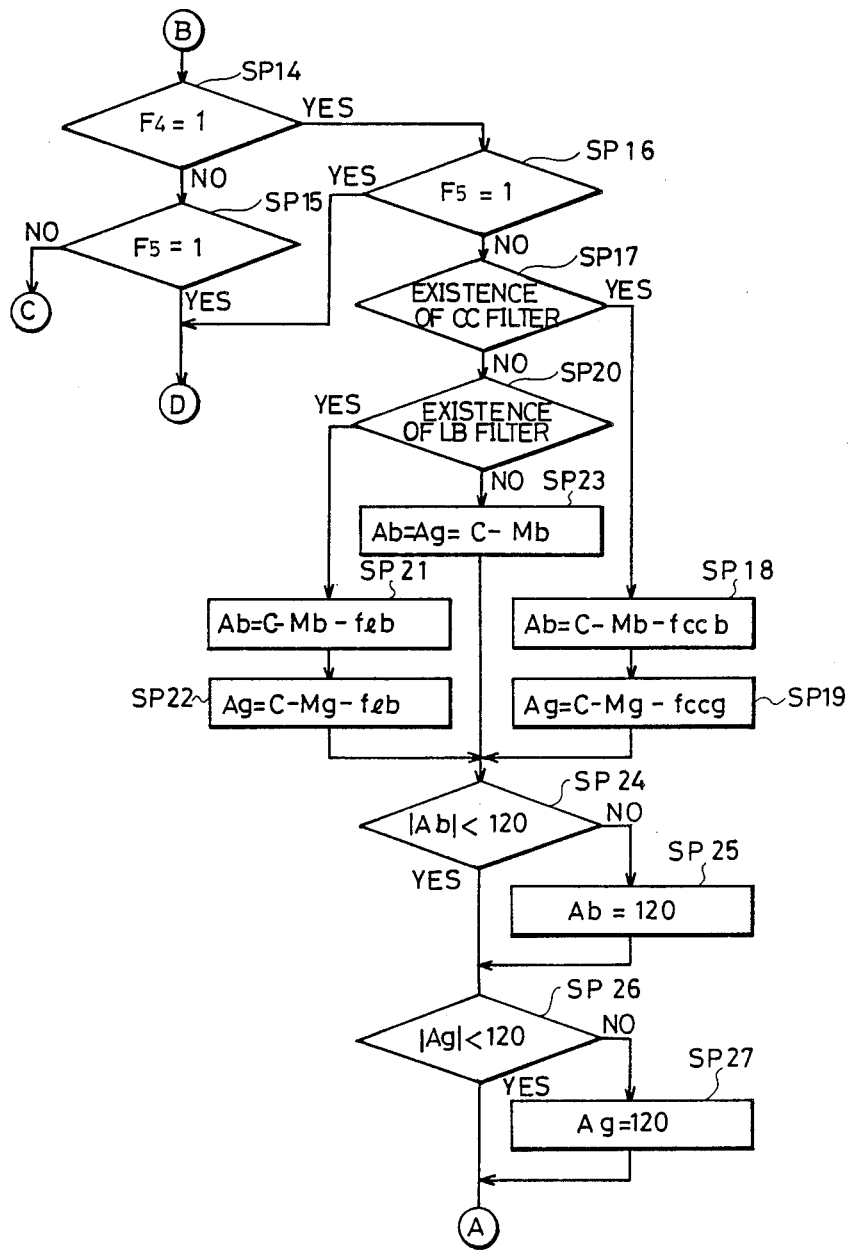
Figure 7C:
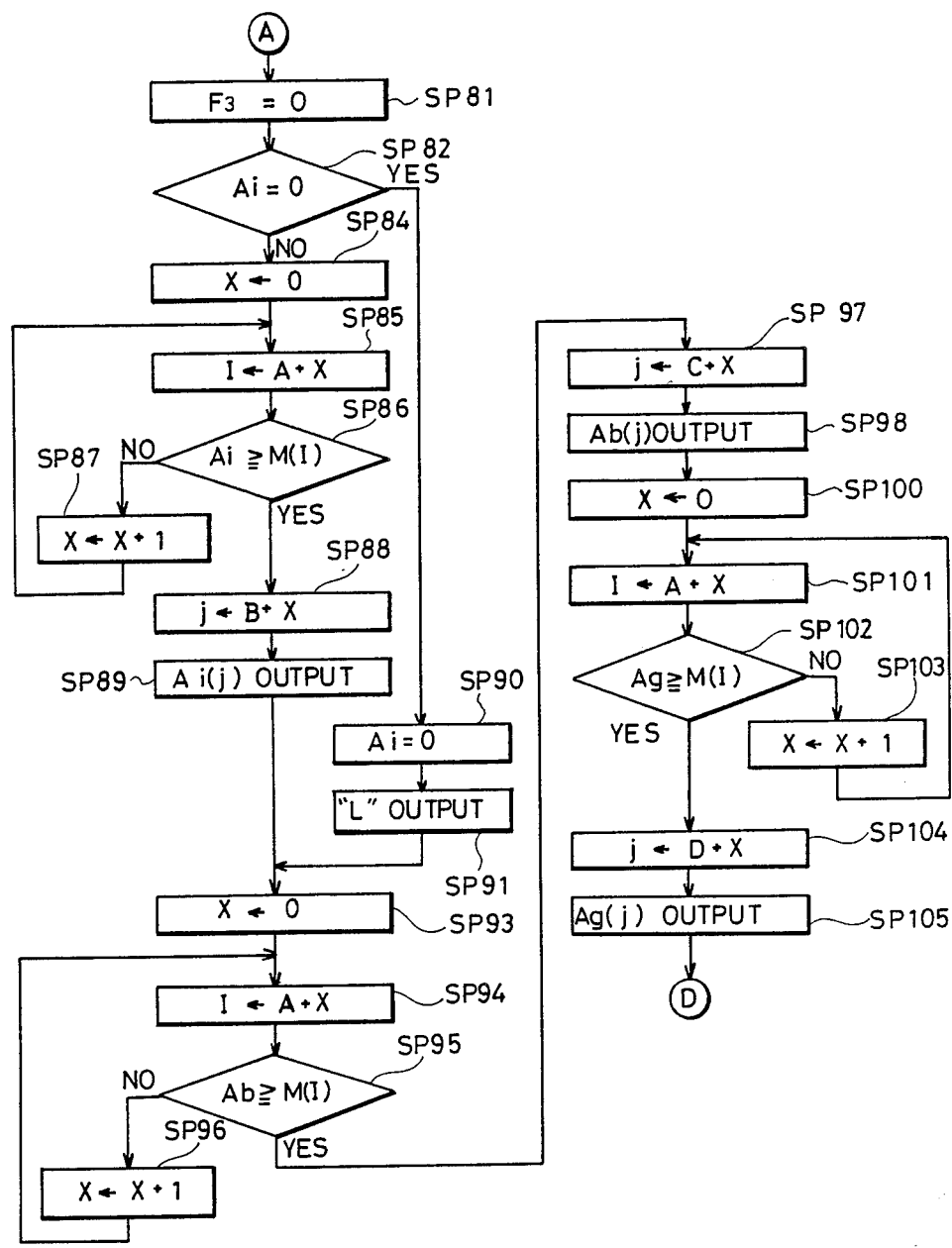
Figure 7D:
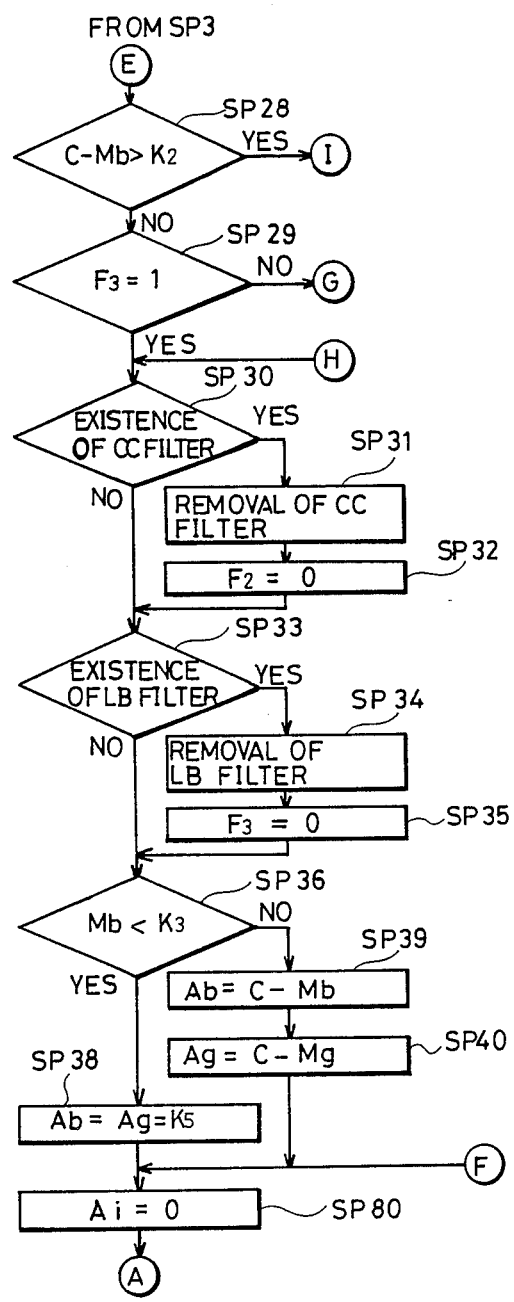
Figure 7E:
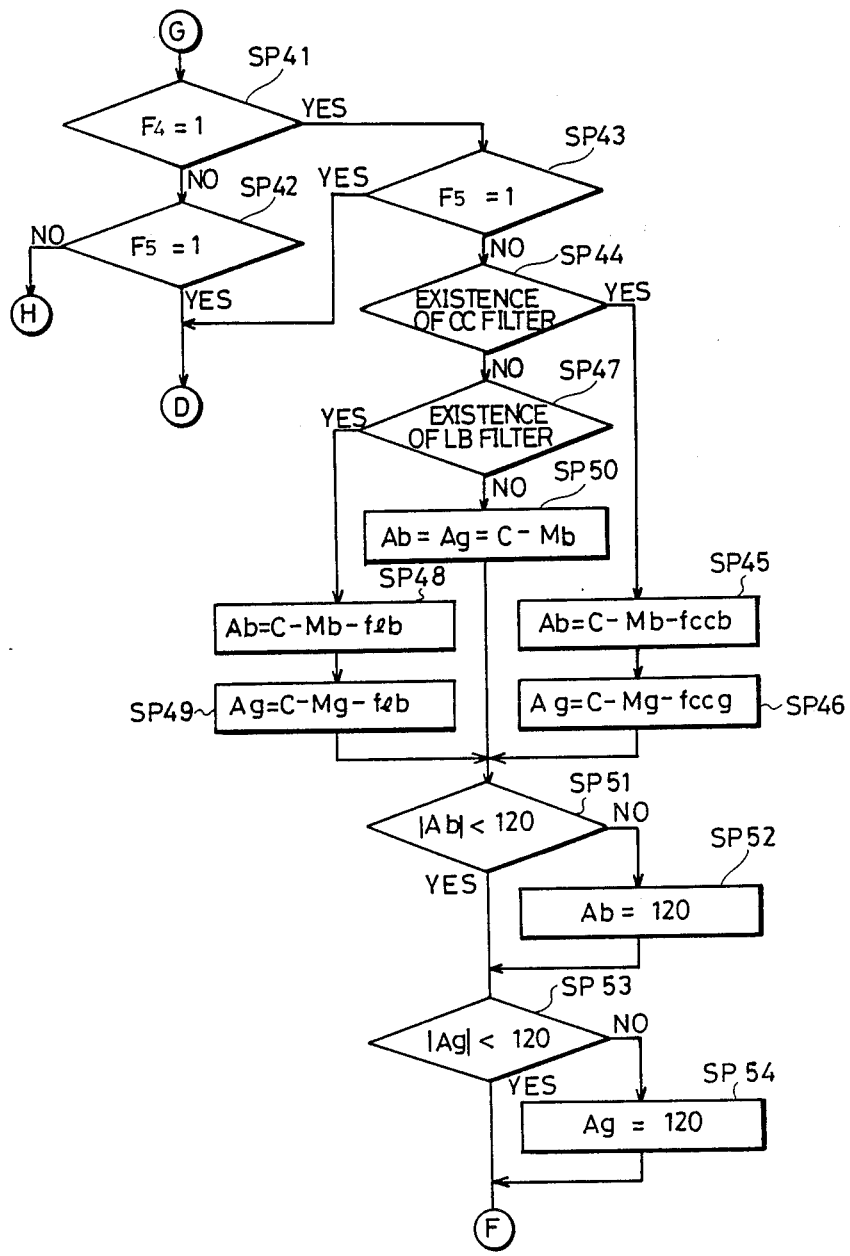
Figure 7F:
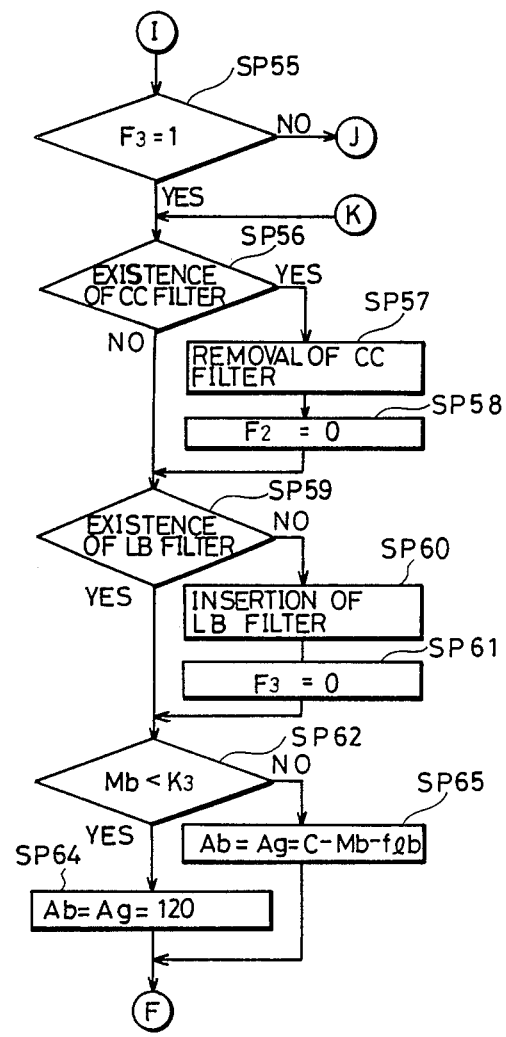
Figure 7G:
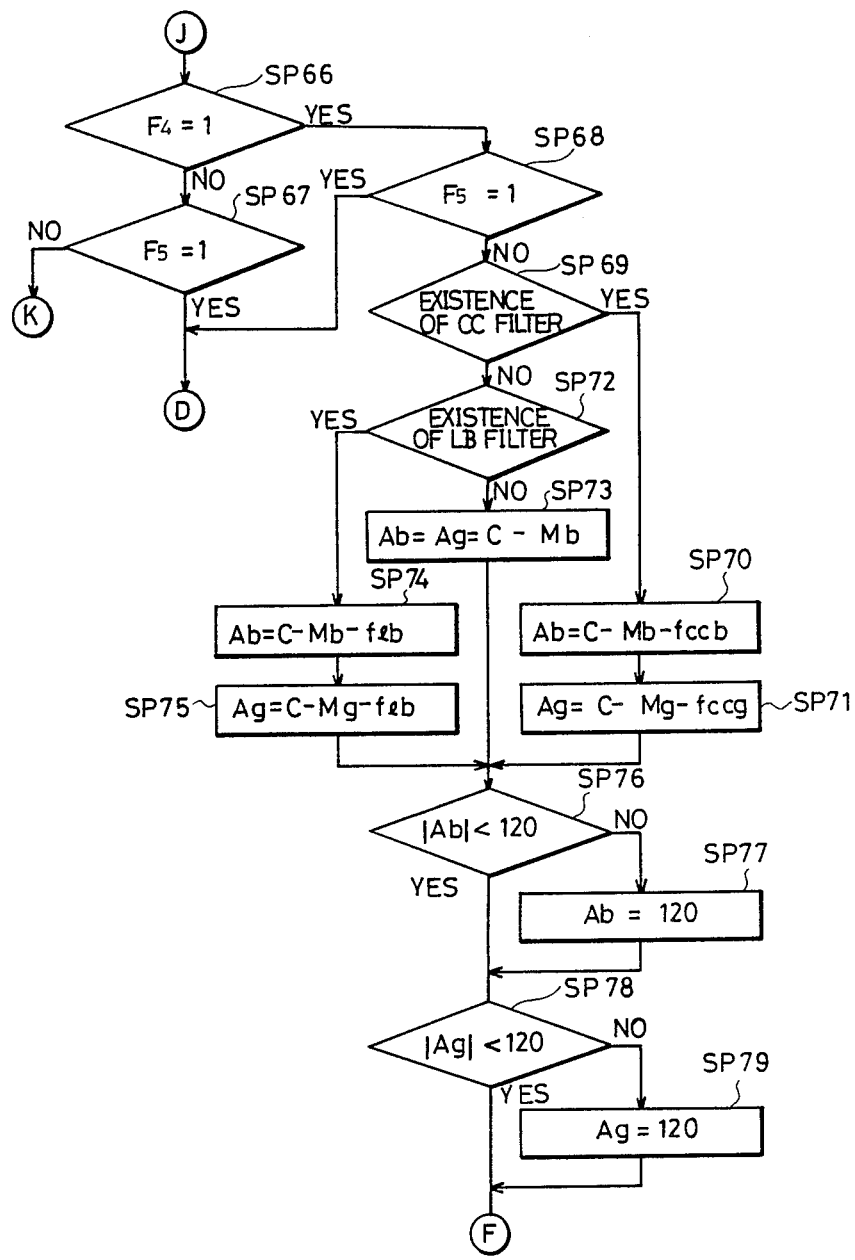

A reference color temperature C at which a prescribed image output is obtained is determined for the image sensor 22 and in a prescribed range around this reference color temperature (for example, ±120 mired), a color temperature can be electrically corrected according to the reference color temperature based on the above stated three kinds of correction signals. FIG. 6 is a diagram showing relations of color temperatures of various light sources to the reference color temperature of the image sensor by using mired as unit representation. FIG. 6 also shows an electrically correctable range, changes of color temperatures of various fluorescent lamps in the case of using the fluorescent light correction filter in the optical path, and an electrically correctable range in the case of using the color temperature conversion filter in the optical path.

Referring to FIG. 2, the operation processing portion 18 is connected with the filter detection switches 30 and 31 shown in FIG. 1 and it is determined by means of those switches which of the filters is moved into or removed from the optical path. In addition, the operation processing portion 18 is connected with a lock member 27 such as a sliding switch for manual selection to determine whether a state of white balance adjustment is to be electrically maintained or not, irrespective of whether a photographing function is started or not. For example, when the photographing function is started by operation of a release button or the like, white balance is adjusted differently dependent on the state of the above stated lock member. A recording state signal output portion 32 outputs, to the operation processing portion 18, a signal indicating whether recording is being effected or not.

Detailed processing procedures of the operation processing portion 18 will be described referring to the flow charts in FIGS. 7A to 7G. Those flow charts are classified roughly into the following procedures: the procedures for calculating color temperatures Mb and Mg based on measured results (in the steps SP0 to SP2); the procedures for determining a type of a light source and levels of the color temperatures based on the above stated calculated color temperatures (in the steps SP3 and SP28); the procedures for using a fluorescent light correction filter and evaluating a correction signal if the light source is a fluorescent lamp (in the steps SP4 to SP27 and SP81); the procedures for evaluating a correction signal if the light source is a natural light source and the color temperature is not high (in the steps SP29 to SP54, SP80 and SP81); the procedures for using the color temperature conversion filter and evaluating a correction signal if the light source is a natural light source and the color temperature is high (in the steps SP55 to SP81); and the procedures for outputting the above stated evaluated correction signals (in the steps SP82 to SP105).

First of all, when the photographing function of the camera is started, procedures starting from the step SP0 are executed. More specifically, a flag F3 is set to store the fact that it is the first measuring operation after start of an active state of the camera (in the step SP0). Then, the ratios V(logB/R) and V(logG/R) outputted from the color measuring circuit 4 in FIG. 2 are read (in the step SP1) and the color temperatures Mb and Mg are calculated from the above indicated equations (1) and (2) based on those ratios (in the step SP2). Subsequently, after executing the procedures in the steps SP110 to SP117 which will be described afterwards, it is determined whether an absolute value of the difference between the calculated color temperatures Mb and Mg does not exceed a prescribed value k1 and, based on this determination, it is determined whether the light source is a natural light source or a fluorescent lamp (in the step SP3). If the light source is a natural light source, it is determined whether the color temperature (for example, Mb) is higher than the reference color temperature C of the image sensor 22 by more than a prescribed value k2 and, based on this determination, it is determined whether a color temperature of the natural light source is in a high color temperature range which requires a color temperature conversion filter (in the step SP28).

If it is determined in the step SP3 that the absolute value of the difference of the calculated color temperatures Mb and Mg exceeds the prescribed value k1 (which is an infinitesimal value taking account of an error of the color measuring system) and that the light source is a fluorescent lamp, the program proceeds to the procedures starting from the step SP4. In those procedures, first it is determined based on the flag F3 whether color measuring operation after start of an active state of the camera has been already effected once or not. If the flag F3 is set and the first color measuring operation is to be started, it is determined based on a signal from the detection switch 31 or a flag F1 storing a state of this switch whether the color temperature conversion filter 16 shown in FIG. 1 exists in the optical path or not (in the step SP5). If the color temperature conversion filter 16 does not exist in the optical path, the program proceeds to the step SP8. If the color temperature conversion filter 16 exists in the optical path, the filter 16 is moved outside the optical path and the program resets the flag F1 in the step SP7 and then proceeds to the step SP8.

In the step SP8, it is determined based on a signal from the detection switch 30 or a flag F2 storing a state of this switch whether the fluorescent light correction filter 15 exists in the optical path or not. If the fluorescent light correction filter 15 exists in the optical path, the program proceeds directly to the step SP11. If the fluorescent light correction filter 15 does not exist in the optical path, the filter 15 is moved into the optical path (in the step SP9) and then the program resets the flag F1 in the step SP10 and proceeds to the step SP11. Thus, the color temperature conversion filter 16 is removed from the optical path and the fluorescent light correction filter 15 is set in the optical path. In the flow charts of FIGS. 7A to 7G, the color temperature conversion filter and the fluorescent light correction filter are shown simply as an LB (light balancing) filter and a CC (color compensating) filter, respectively Subsequently, color-difference correction values Ab and Ag are calculated based on the reference color temperature C of the image sensor 22, the calculated color temperatures Mb and Mg, and color temperature correction amounts fccb and fccg of the fluorescent light correction filter 15, and an iris correction value Ai is calculated based on the calculated correction values Ab and Ag (in the steps SP11 to SP13).

$$Ab = C - Mb - fccb \tag{3}$$

$$Ag = C - Mg - fccg \tag{4}$$

$$Ai = Ab - Ag \tag{5}$$

On the other hand, if it is determined in the SP4 that the color measuring operation is the second operation or operation subsequent thereto (the flag F3 is reset at this time), it is determined whether the camera is in a recording state or not (in the step SP14) and whether locking of white balance adjustment is designated or not (in the steps SP15 and SP16). If recording is not being performed and locking of white balance adjustment is not designated, the program returns to the above stated step SP5 to perform color measuring operation. If locking of white balance adjustment is designated, the program proceeds to the step SP1 irrespective of whether recording is being performed or not, thereby to repeat the above described procedures. Thus, the correction values Ab, Ag and Ai calculated immediately before designation of locking are maintained. The determination as to whether recording is being performed and the determination as to whether locking is designated or not are made by reading input signals from the recording signal output portion 32 and the lock member 27 after the light measuring and calculation operation (in the steps SP1 and SP2) for example, to set flags F4 and F5 (in the steps SP110 to SP117).

If recording is being performed and locking of white balance adjustment is not designated, the locations of the fluorescent light correction filter 15 and the color temperature conversion filter 16 are determined so as to calculate correction values Ab and Ag according to the locations of the respective filters (in the steps SP17 to SP27). More specifically, if only the fluorescent light correction filter 15 exists in the optical path, the color-difference correction values Ab and Ag are calculated from the above indicated equations (3) and (4); if only the color temperature conversion filter 16 exists in the optical path, those correction values are calculated from equations (6) and (7) indicated below based on a color temperature conversion amount flb of the filter 16; and if neither of those filters exists in the optical path, those correction values are calculated from an equation (8) indicated below (in the steps SP17 to SP23).

$$Ab = C - Mb - flb \quad (6)$$

$$Ag = C - Mg - flg \quad (7)$$

$$Ab = Ag = C - Mb \quad (8)$$

Then, it is determined whether those calculated correction values Ab and Ag are in an electrically correctable range ($\pm 120$ mired) or not. If those correction values are not in that range, those values are replaced by limit values thereof. Thus, if recording is being performed and white balance adjustment is not locked, mechanical corrections such as movement of the filters and driving of the iris diaphragm are not performed and only electrical correction of the color-difference signals is performed. One of the reasons for this is that if a mechanical correction (particularly movement of the filters) is performed during recording, an abrupt change in the color temperature occurs on the image area of the image sensor and white balance adjustment can not be easily responsive to that change, resulting in unsatisfactory color reproduction. Another reason is that if mechanical corrections are performed, noises occurring in the corrections are recorded unavoidably through a microphone contained in the video camera, which is not favorable for recording.

After the calculation of those correction values Ab, Ag and Ai, the flag F3 is reset and an end of the first color measuring operation is stored (in the step SP81).

Next, let us assume a case in which it is determined in the step SP3 that the absolute value of the difference between the calculated color temperatures Mb and Mg does not exceed the prescribed value k1 and that the light source is a natural light source. First of all, in the step SP28, it is determined whether or not the calculated color temperature Mb ($=Mg$) is higher than the reference color temperature C of the image sensor 22 by more than the prescribed value k2, in other words, whether or not the calculated color temperature exceeds the electrically correctable range of 120 mired to make it necessary to use the color temperature conversion filter 16. If a difference between the calculated color temperature Mb and the reference color temperature C is within the electrically correctable range, the program proceeds to the step SP29. In the step SP29, it is determined based on the flag F3, in the same manner as in the above stated step SP4, whether color measuring operation after start of the active state of the camera is the first operation or not. If it is the first color measuring operation, it is determined whether the fluorescent light correction filter 15 exists in the optical path or not (in the step SP30). If the filter 15 does not exist in the optical path, the program proceeds directly to the step SP33. If the fluorescent light correction filter 15 exists in the optical path, the fluorescent light correction filter 15 is moved away from the optical path (in the step SP31) and then the program proceeds to the step SP33. In the step SP33, it is determined whether the color temperature conversion filter 16 exists in the optical path or not. If the color temperature conversion filter 16 does not exist in the optical path, the program proceeds directly to the step SP36. If the color temperature conversion filter 16 exists in the optical path, the color temperature conversion filter 16 is moved away from the optical path and then the program proceeds to the step SP36. Thus, both of the fluorescent light correction filter 15 and the color temperature conversion filter 16 are moved away from the optical path.

In the step SP36, it is determined whether the calculated temperature Mb is lower than an electrically correctable lower limit value k3 corresponding to 400 mired) of the color temperature. If it is lower than the lower limit value k3, a further lower limit value k5 for electrical correction is adopted as the correction values Ab and Ag (in the step SP38). If the value Mb is not lower than the lower limit value k3, the correction values Ab and Ag are calculated from the following equations (9) and (10) (in the steps SP39 and SP40).

$$Ab = C - Mb \quad (9)$$

$$Ag = C - Mg \quad (10)$$

After that, the iris correction value Ai is set to 0 (in the step SP80) and the flag F3 is reset (in the step SP81). If it is determined in the step SP29 that color measuring operation is the second operation or a further subsequent operation, the correction values Ab and Ag are calculated by the same procedures (in the steps SP41 to SP54) as in the above stated steps SP14 to SP27 in the case of the fluorescent lamp and then the program proceeds to the above stated step SP80. The procedures in this step are the same as described above and therefore description thereof is omitted.

On the other hand, if it is determined in the step SP28 that the difference between the calculated color temperature Mb and the reference color temperature C is not in the electrically correctable range, the program proceeds to the step SP55. In the step SP55, it is determined based on the flag F3, in the same manner as in the above stated step SP4, whether color measuring operation after start of the active state of the camera is the first color measuring operation or not. If it is the first color measuring operation, it is determined whether the fluorescent light correction filter 15 exists in the optical path or not (in the seep SP56). If the fluorescent light correction filter 15 does not exist in the optical path, the program proceeds directly to the step SP59. If the fluorescent light correction filter 15 exists in the optical path, the fluorescent light correction filter 15 is moved away from the optical path and then the program proceeds to the step SP59. In the step SP59, it is determined whether the color temperature conversion filter 16 exists in the optical path or not. If the color temperature conversion filter 16 exists in the optical path, the program proceeds directly to the step SP62. If the color temperature conversion filter 16 does not exist in the optical path, the color temperature conversion filter 16 is moved into the optical path and then the program proceeds to the step SP62. Thus, oppositely to the case of the fluorescent lamp, the color temperature conversion filter 16 is moved into the optical path and the fluorescent light correction filter 15 is moved away from the optical path.

In the step SP62, it is determined whether the calculated color temperature Mb exceeds an electrically correctable upper limit value k4 (corresponding to 100 mired) of the color temperature or not. If it exceeds the upper limit value k4, an electrically correctable upper limit value 120 is adopted as the correction values Ab and Ag (in the step SP64). If it does not exceed the value k4, the correction values Ab and Ag (Ab=Ag in this case) are calculated from the above indicated equations (6) and (7) (in the step SP65). After that, the iris correction value Ai is set to 0 (in the step SP80) and the flag F3 is reset (in the step SP81).

If it is determined in the step SP55 that color measuring operation to be performed is the second operation or a further subsequent operation, the correction values Ab and Ag are calculated by the same procedures (in the steps SP66 to SP79) as in the above stated steps SP14 to SP27 in the case of the fluorescent lamp and then the program proceeds to the step SP80. The procedures in this step are the same as described above and therefore description thereof is omitted.

When the correction values Ab, Ag and Ai are calculated as described above dependent on whether the light source is a fluorescent lamp or a natural light source, data based on those calculated values are read by the procedures starting from the step SP82. The data corresponding to the respective calculated values are classified into three groups corresponding to Ab, Ag and Ai and stored in advance in the respective addresses of an ROM (not shown). Thus, the respective calculated values correspond to the addresses of the ROM. Accordingly, by designating addresses corresponding to the respective calculated values, the data Ai(j), Ab(j) and Ag(j) corresponding to the respective calculated values are outputted successively in the order of Ai, Ab and Ag from the operation processing portion 18 to the digital-to-analog converter 20 (in the steps SP82 to SP105). Prescribed operation is performed by the video camera based on those data. After output of the data, the program returns to the step SP1 to repeat the above described procedures. The iris correction data Ai(j) is corrected and outputted in a form such as a value Ev and converted to an aperture correction amount according to an output of the known iris aperture value detector 33 so that an exposure level is corrected.

As described above, in this embodiment, the video camera for performing white balance adjustment by electrically correcting an image output based on measured color information is adapted to control white balance adjustment dependent on manual selection as to whether the state of white balance adjustment is locked or not, and also dependent on determination as to whether color measuring operation in an active state of the camera is the first operation or the second or other subsequent operation and if color measuring operation is the first operation, white balance adjustment based on the measured color information is performed irrespective of whether the state of white balance adjustment is locked or not. Consequently, even if fixation of a state of white balance adjustment is selected before the camera is in an active state, suitable white balance adjustment can be performed based on the measured color information at the time of starting an active state of the camera.

Figure 13:
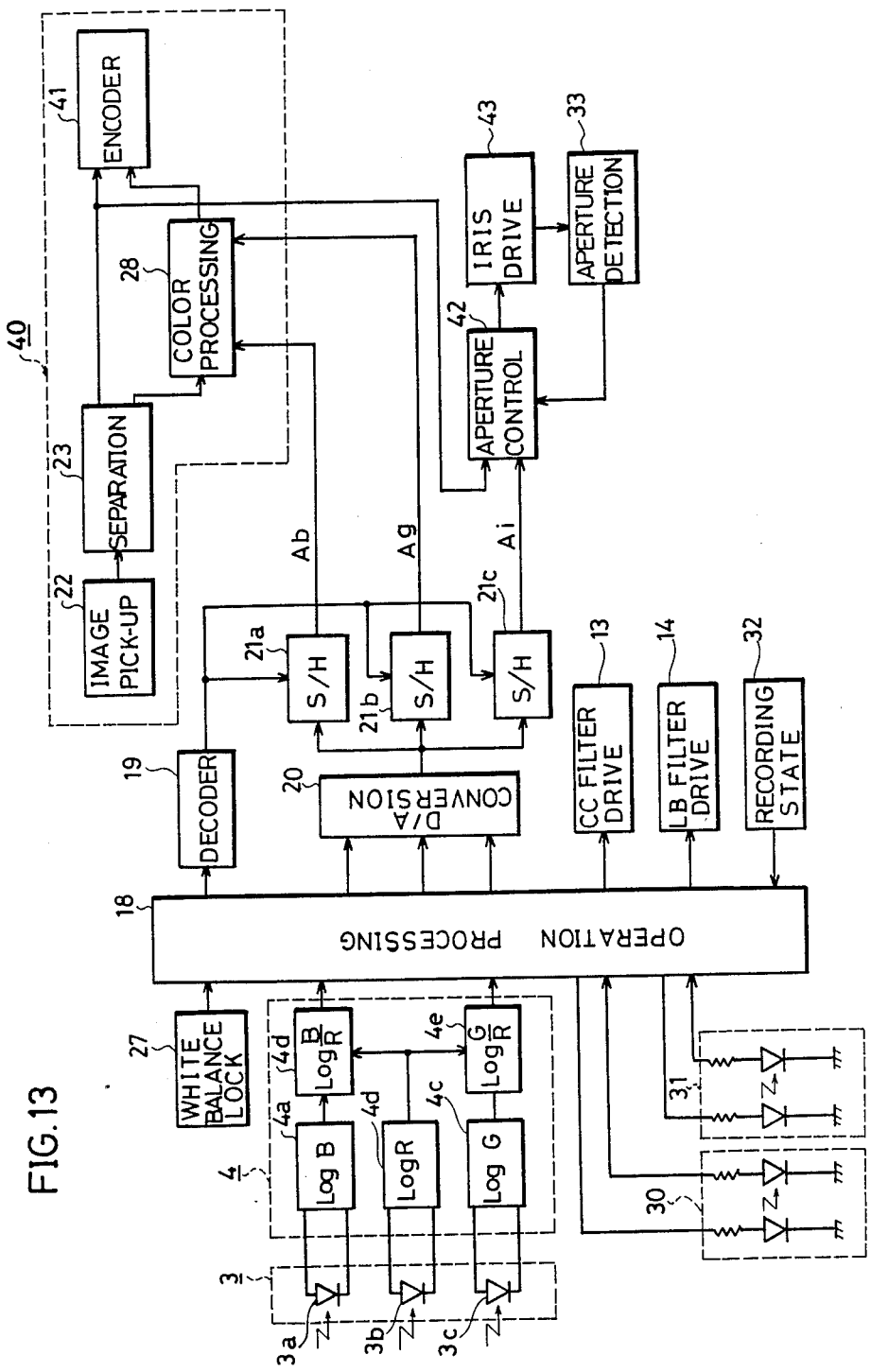
FIG. 13 is a schematic block diagram showing an entire circuit configuration of another embodiment of the present invention.

FIG. 13 is a schematic block diagram showing an entire construction of another embodiment of the present invention. The embodiment shown in FIG. 13 is the same as the above described embodiment shown in FIG. 2 except for the following points. A video processing portion 40 in the embodiment shown in FIG. 13 comprises an image sensor 22, a video signal separating circuit 23, a color signal processing circuit 28 and an encoder 41. The color signal processing circuit 28 receives color-difference signals (B-Y) and (R-Y) separated by the video signal separating circuit 23, and also receives the color-difference signal correction values Ab and Ag inputted to the sample-and-hold circuits 21a and 21b. Levels of the color-difference signals (B-Y) and (R-Y) are controlled according to those correction values so that white balance in color components is adjusted. The encoder 41 processes the thus adjusted color-difference signals and a luminance signal Y by a well-known method thereby to output a signal NTSC. The color signal processing circuit 28 may process color signals R, G and B instead of processing the color-difference signals (R-Y) and (B-Y) and in this case, white balance adjustment is controlled in the same manner by the above stated correction values.

If the light source is a fluorescet lamp, a fluorescent light correction filter 15 having a spectral transmittance characteristic shown in FIG. 11 is moved into the optical path so that a green component can be decreased to some degree. However, the green component can not be suppressed to such a degree as to assure suitable exposure. The remaining correction part of the light is calculated as an aperture correction amount in an aperture control circuit 42 based on the aperture correction value Ai calculated in the operation processing circuit 18.

The aperture control circuit 42 receives a luminance signal separated and smoothed by the video signal separating circuit 23, an aperture value detected by the aperture detecting circuit 33, and the aperture correction value Ai (a converted amount of Ev) supplied to the sample-and-hold circuit 21c. The aperture control circuit 42 comprises: a portion for removing an aperture component contained in the luminance signal based on the above stated detected aperture value; a portion for obtaining a difference between a level of the luminance signal from which the aperture component has been removed and a level of a reference level signal, thereby to calculate an aperture drive amount according to the difference; and a portion for adding the above stated aperture correction value to the detected aperture value in the above stated removing portion. An iris drive circuit 43 controls an aperture diameter of the iris diaphragm 12 based on the calculated drive amount so that the level of the luminance signal excluding the aperture component coincides with the reference level. The aperture correction value Ai is 0 in the case of a blackbody radiation source, while in the case of a fluorescent lamp, the value Ai becomes a value dependent on a color temperature of the fluorescent lamp and a correction amount of a color temperature of the fluorescent light correction filter 15. In other words, in the case of a fluorescent lamp, the iris diaphragm 12 is opened to a larger extent than in the case of a blackbody radiation source by the aperture correction value Ai. The other operation is the same as described above with reference to FIGS. 7A to 7G.

Figure 14:
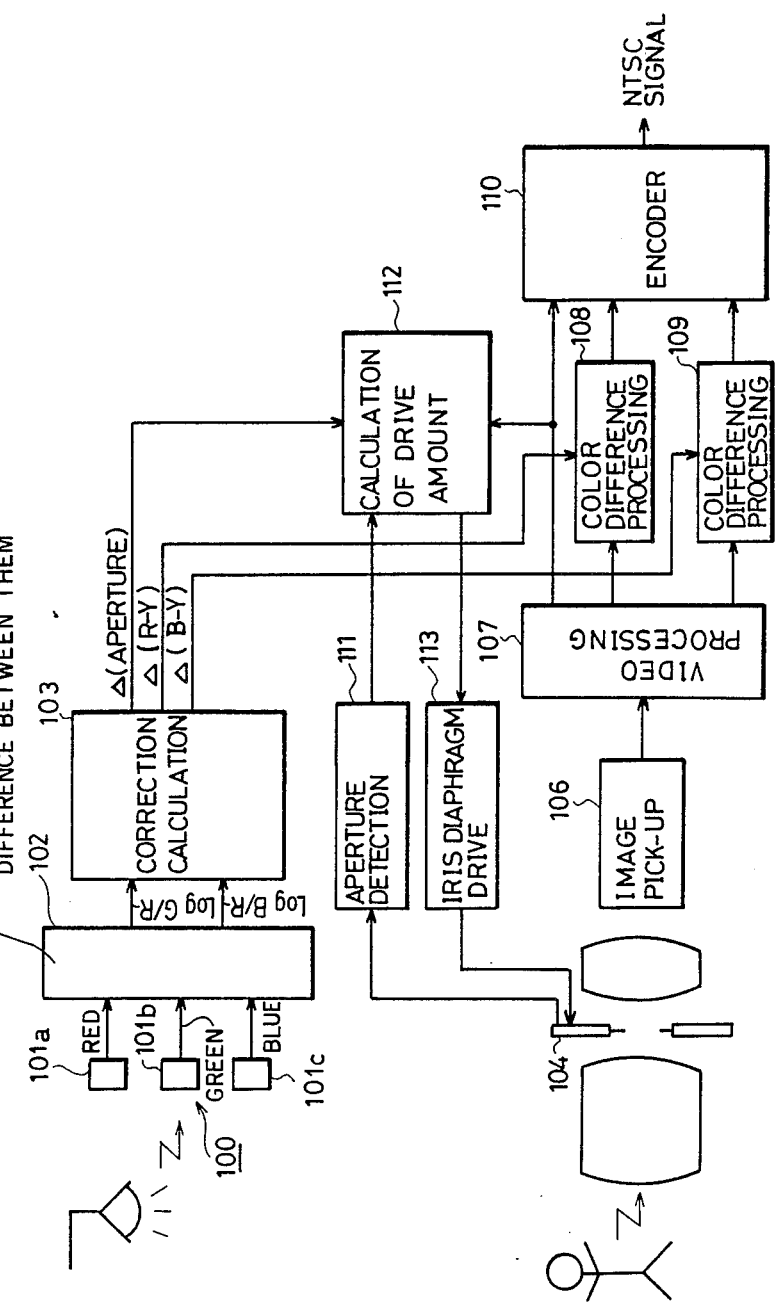
FIG. 14 is a schematic block diagram showing a configuration of a further embodiment of the present invention.

FIG. 14 is a schematic block diagram showing an entire construction of a further embodiment of the present invention. Referring to FIG. 14, a color measuring sensor 100 is provided in a position permitting the sensor 100 to receive light directly and indirectly from a light source irradiating an object, for example, in an upper front portion of the camera. The color measuring sensor 100 comprises three photoelectric conversion elements 101a, 101b and 101c provided with a red color transmitting filter, a green color transmitting filter and a blue color transmitting filter, respectively, on the respective front faces thereof. Those photoelectric conversion elements output electric signals corresponding to a red color component, a green color component and a blue color component of the light from the light source or an object found in a wide range. Spectral sensitivity characteristics of those photoelectric conversion elements are shown in FIG. 10. An analog circuit 102 comprises a portion for logarithmically compressing the above stated respective spectral components and a portion for calculating a difference among the logarithmically compressed spectral components. The analog circuit 102 outputs a signal logG/R indicating a ratio of the green color component to the red color component and a signal logB/R indicating a ratio of the blue color component to the red component. A correction calculating circuit 103 determines a color temperature of the light source based on the relation of the above stated two ratio signals and outputs a white balance correction amount $\Delta(R-Y)$ and $\Delta(B-Y)$ according to the detected color temperature. Further, the circuit 103 determines spectral radian intensity of the light source based on the relation of those ratio signals and outputs an aperture correction value according to the spectral radiant intensity.

An image pickup means 106 such as a CCD image sensor forms an image from light reflected from an object irradiated by the above stated light source and outputs a video signal of the image. The video signal is processed in a video processing circuit 107 so that it is separated into a chrominance signal and a luminance signal. Color difference processing circuits 108 and 109 control a level of the chrominance signal based on the white balance correction value $\Delta(R-Y)$ and $\Delta(B-Y)$ and output a chrominance signal excluding influence by the color temperature of the light source. An encoder circuit 110 processes by a well-known method the chrominance signal having white balance adjusted by the color-difference processing circuits 108 and 109, and the luminance signal. from the video processing circuit 107, thereby to provide a NTSC signal.

An iris diaphragm 104 is provided in a photographing optical system in front of the image pickup means 106. An aperture diameter of the iris diaphragm 104 is detected by a well-known aperture value detecting circuit 111 and the detected aperture value is supplied to a drive amount calculating circuit 112. The drive amount calculating circuit 112 comprises: a portion for removing an aperture component contained in the luminance signal from the video processing circuit 107 based on the detected aperture value; a portion for outputting a reference level signal changing according to the aperture correction value from the correction calculating circuit 103; and a portion for calculating a difference between the level of the reference level signal and a level of the luminance signal excluding the aperture component, thereby to calculate a diaphragm drive amount according to the difference. An iris diaphragm drive circuit 113 controls an aperture amount of the iris diaphragm 104 based on the calculated drive value so that the level of the luminance signal of the video processing circuit 107 always coincides with the reference level.

Figure 15:
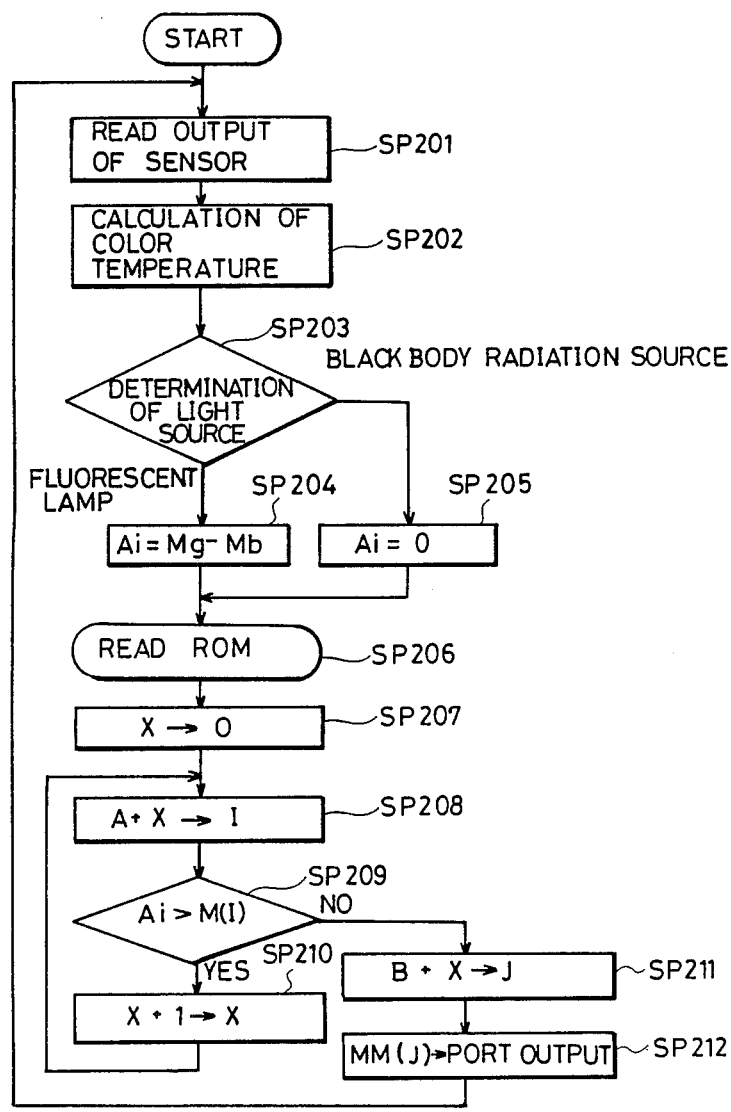
FIG. 15 is a flow chart for explaining operation of the embodiment shown in FIG. 14.

Details of operation concerning output of the aperture correction value from the correction calculating circuit 103 will be described referring to the flow chart in FIG. 15. Since operation concerning output of the white balance correction value has no relation with the essential feature of the present invention, description thereof is omitted. Referring to FIG. 15, first of all, ratio signals logB/R and logG/R calculated by the analog circuit 102 are read (in the step SP201) and color temperature information is obtained based on those data (in the step SP202).

Subsequently, it is determined whether the absolute value of the difference between the calculated color temperatures Mb and Mg does not exceed a prescribed value k1 and, based on this determination, it is determined whether the light source is a blackbody radiation source or a fluorescent lamp (in the step SP203). More specifically, if the absolute value is equal to the prescribed value k1 or less, it is determined that the light source is a blackbody radiation source. If the absolute value exceeds the prescribed value k1, it is determined that the light source is a fluorescent lamp. If the light source is determined to be a blackbody radiation source, 0 is set as the calculated value Ai so that aperture correction is not performed (in the step SP205). On the other hand, if the light source is determined to be a fluorescent lamp, the difference (Mg-Mb) is set as the calculated value Ai (in the step SP204).

Since a relation between the above stated difference (Mg-Mb) and an exposure correction value is definitely determined by spectral sensitivity of the luminance signal, spectral sensitivity of the light measuring sensor 100, spectral radiant intensity of the reference color temperature light source etc., the ROM is adapted so that by obtaining in advance n sets, for example, of relations between the calculated value and the exposure correction value, exposure correction values $\beta 1, \beta 2, \ldots, \beta n$ are stored in addresses corresponding to calculated values $\alpha 1, \alpha 2, \ldots, \alpha n$, respectively. A concrete example for reading the exposure correction values will be described. It is assumed that the calculated values $\alpha 1$ to $\alpha n$ are stored in the addresses E to $(E+n-1)$ of the ROM shown in FIG. 16, respectively, and that the exposure correction values $\beta 1$ to $\beta n$ are stored in the addresses F to $(F+n-1)$ of the ROM, respectively. First, an address $(E+X)$ which is counted by X from the address E and in which a value approximate to the calculated value Ai obtained in the step SP204 is stored is determined based on differences between Ai and α1 to αn (in the steps SP206 to SP210). Then, an address (F+X) is designated by the above stated number X so that an exposure correction value β corresponding thereto is read out and outputted (in the steps SP211 and SP212).

If the light source is determined to be a fluorescent lamp based on the color temperature information from the color measuring sensor 100 for white balance adjustment as described above, an exposure correction value corresponding to the color temperature information is automatically outputted. The thus outputted value and an aperture value obtained by an aperture value detecting circuit 111 are inputted to the drive amount calculating circuit 112. Thus, an aperture correction drive amount is obtained and based on this amount, aperture correction is automatically performed. The aperture correction amount can be controlled by controlling aperture drive current according to the aperture value.

Although the case of a fluorescent lamp was described as an example of a non-blackbody radiation source as the light source in the above stated embodiment, the present invention is also applicable to other artificial light sources such as a sodium lamp. In such cases, an aperture correction value is, needless to say, determined according to a spectral radiant intensity distribution of the artificial light source.

As described in the foregoing, according to the embodiments of the present invention, color temperature information obtained by the color measuring means is utilized not only for white balance adjustment of the video signal of the image pickup means, but also for compensation for insufficient exposure caused by spectral radiant intensity of a fluorescent lamp for example used as the light source by control of an aperture value of the diaphragm. Thus, it is not required to do complicated manual operation, as conventionally required, such as attachment or removal of a fluorescent light correction filter dependent on whether the light source is for example a fluorescent lamp or not. Thus, the present invention makes it possible to automatically obtain a suitably exposed image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white balance adjusting device for a color video camera, comprising:
   image pickup means for picking up an image of an object,
   color measuring means for outputting color information corresponding to a color temperature of ambient light,
   correction means for electrically correcting an output of said image pickup means based on the color information outputted from said color measuring means, thereby to perform a white balance adjustment,
   optical filter means selectively interposable in an optical path of said image pickup mean and used for optically modifying light incident on said image pickup means,
   drive means for moving said optical filter means into or from said optical path based on the color information,
   recording state detection means for detecting whether the video camera is in a recording state or a non-recording state, and
   control means for controlling said drive means and said correction means to forbid operation of said drive means and to permit operation of said correction means in response to detection of the recording state by said recording detection means, and to permit operation of said drive means and operation of said correction means in response to detection of the non-recording state by said recording detection means.

2. A white balance adjusting device for a color video camera for photographing an object irradiated by light from a blackbody radiation source or a non-blackbody radiation source, comprising:
   image pickup means for picking up an image of said object,
   color measuring means for outputting color information corresponding to a color temperature of ambient light,
   light source determination means for determining, based on the color information form said color measuring means, whether the source of the ambient light is the blackbody radiation source or the non-blackbody radiation source,
   a non-blackbody radiation correction filter selectively interposable in an optical path of said image pickup means and used for optically modifying light incident on said image pickup means from said object irradiated by light from the non-blackbody radiation source,
   drive means for moving said non-blackbody radiation correction filter into or from said optical path based on the color information,
   correction means for electrically correcting an output of said image pickup means based on the color information outputted from said color measuring means and data of a correction amount corresponding to said non-blackbody radiation correction filter, thereby to perform a white balance adjustment, and
   control means for controlling said drive means to cause said non-blackbody radiation correction filter to be moved into said optical path when it is determined by said light source determination means that said ambient light source is the non-blackbody radiation source, and to cause said non-blackbody radiation correction filter to be moved form said optical path when it is determined by said light source determination means that said ambient light source is the blackbody radiation source.

3. A white balance adjusting device for a color video camera in accordance with claim 2, wherein
   said non-blackbody radiation source includes a fluorescent lamp and said non-blackbody radiation correction filter includes a fluorescent light correction filter.

4. A white balance adjusting device for a color video camera for photographing an object irradiated by light from a blackbody radiation source or a non-blackbody radiation source, comprising:
   image pickup means for picking up an image of said object, color measuring means for outputting color information corresponding to a color temperature of ambient light, light source determination means for determining, based on the color information from said color measuring means, whether the source of the ambient light is the blackbody radiation source or the non-blackbody radiation source, difference determination means for determining whether a difference between a reference color temperature for said image pickup means and the color temperature of the ambient light exceeds a prescribed value or not, a non-blackbody radiation correction filter selectively interposable in an optical path of said image pickup means and used for optically modifying light incident on said image pickup means from said object irradiated by light from the non-blackbody radiation source, a color temperature conversion filter selectively interposable in said optical path of said image pickup means for optically converting light incident on said image pickup means from said object irradiated by light from the blackbody radiation source to light having the reference color temperature, non-blackbody radiation correction filter drive means for moving said non-blackbody radiation correction filter into or from said optical path based on said color information, color temperature conversion filter drive means for moving said color temperature conversion filter into or from said optical path, correction means for electrically correcting an output of said image pickup means based on the color information outputted from said color measuring means, data of a correction amount corresponding to said non-blackbody radiation correction filter, and data of a correction amount corresponding to said color temperature conversion filter, thereby to perform a white balance adjustment, and control means for controlling said non-blackbody radiation correction filter drive means to cause said non-blackbody radiation correction filter to be moved into said optical path when it is determined by said light source determination means that said ambient light source is the non-blackbody radiation source, and to cause said non-blackbody radiation correction filter to be moved from said optical path when it is determined by said light source determination means that said ambient light source is the blackbody radiation source, and controlling said color temperature conversion filter drive means to cause said color temperature conversion filter to be moved into said optical path when it is determined by said difference determination means that the difference between the reference color temperature for said image pickup means and the color temperature of the ambient light exceeds said prescribed value, and to cause said color temperature conversion filter to be moved from said optical path when it is determined by said difference determination means that said difference does not exceed said prescribed value.

5. A white balance adjusting device for a color video camera in accordance with claim 4, wherein
said non-blackbody radiation source includes a fluorescent lamp and said non-blackbody radiation correction filter includes a fluorescent light correction filter.

6. A white balance adjusting device for a color video camera in accordance with claim 4, further comprising:
an iris diaphragm for adjusting an amount of light incident on said image pickup means,
aperture control means for controlling an aperture opening of said iris diaphragm based on a level of a luminance component contained in the output of said image pickup means, and
correction value output means for calculating an exposure correction value corresponding to the color information outputted from said color measuring means when said determination means determines that said light source is not the blackbody radiation source, and outputting the exposure correction value to said aperture control means as a signal for correcting the aperture opening by an amount corresponding to the exposure correction value.

7. A white balance adjusting device for a color video camera in accordance with claim 6, wherein
said correction value output means comprises means for calculating an exposure correction value based on the color information outputted from said color measuring means and a spectral transmittance characteristic of said non-blackbody radiation correction filter, thereby to output the calculated exposure correction value to said aperture control means as a signal for correcting the aperture opening by an amount corresponding to the calculated exposure correction value.

8. A white balance adjusting device for a color video camera in accordance with claim 6, wherein
said color measuring means comprises a spectrum sensor for measuring the intensity of incident light by separating the incident light into three wavelength components of red, green and blue,
said light source determination means comprising means for determining whether said ambient light source is the blackbody radiation source or the non-blackbody radiation source, based on a relationship between a first ratio of a specified one of the three wavelength components to a second wavelength component of the three wavelength components, and a second ratio of the specified wavelength component to a third wavelength component of the three wavelength components, and
said correction value output means comprises means for outputting an exposure correction value corresponding to said relationship.

9. A white balance adjusting device for a video camera for photographing an object irradiated by light from a blackbody radiation source or a non-blackbody radiation source, comprising:
image pickup means for picking up image of said object,
color measuring means for outputting color information corresponding to a color temperature of ambient light,
light source determination means for determining, based on the color information from said color measuring means, whether the source of said ambient light is the blackbody radiation source or the non-blackbody radiation source,
correction means for electrically correcting an output of said image pickup means based on the color information outputted from said color measuring means, thereby to perform a white balance adjustment, an iris diaphragm for adjusting an amount of light incident on said image pickup means, aperture control means for controlling an aperture opening of said iris diaphragm based on a level of a luminance component contained in the output of said image pickup means, and correction value output means for calculating an exposure correction value corresponding to the color information outputted from said color measuring means when said determination means determines that said ambient light source is not the blackbody radiation source, and outputting the exposure correction value to said aperture control means as a signal for correcting the aperture opening by an amount corresponding to said exposure correction value.

10. A white balance adjusting device for a video camera in accordance with claim 9, wherein said color measuring means comprises a spectrum sensor for measuring the intensity of incident light by separating the incident light into three wavelength components of red, green and blue, and said light source determination means comprises means for determining whether said ambient light source is the blackbody radiation source or the non-blackbody radiation source, based on a relationship between a first ratio of a specified one of the three wavelength components to a second wavelength component of the three wavelength components, and a second ratio of the specified wavelength component to a third wavelength component of the three wavelength components.

11. A white balance adjusting device for a color video camera for photographing an object irradiated by light from a black body radiation source or a fluorescent lamp, comprising:

image pickup means for picking up an image of said object, color measuring means for outputting color information corresponding to a color temperature of ambient light, light source determination means for determining, based on the color information form said color measuring means, whether the source of the ambient light is the blackbody radiation source or the fluorescent lamp, a fluorescent light correction filter selectively interposable in an optical path of said image pickup means and used for optically modifying light incident on said image pickup means from said object irradiated by light from the fluorescent lamp, drive means for moving said fluorescent light correction filter into or from said optical path based on said color information, correction means for electrically correcting an output of said image pickup means based on the color information outputted from said color measuring means and data of a correction amount corresponding to said fluorescent light correction filter, thereby to perform a white balance adjustment, an iris diaphragm for adjusting an amount of light incident on said image pickup means, aperture control means for controlling an aperture opening of said iris diaphragm based on a level of a luminance component contained in the output of said image pickup means, and correction value output means for calculating an exposure correction value based on the color information outputted from said color measuring means and a spectral transmittance characteristic of said fluorescent light correction filter when said light source determination means determines that said light source is the fluorescent lamp, and outputting the exposure correction value to said aperture control means as a signal for correcting the aperture opening by an amount corresponding to the exposure correction value.

* * * * *